(12) United States Patent
Qiao

(10) Patent No.: US 6,482,275 B1
(45) Date of Patent: Nov. 19, 2002

(54) NICKEL BASED ALLOYS FOR INTERNAL COMBUSTION ENGINE VALVE SEAT INSERTS, AND THE LIKE

(75) Inventor: Cong Yue Qiao, Menominee, MI (US)

(73) Assignee: L. E. Jones Company, Menominee, MI (US)

(*) Notice: Subject to any disclaimer, the term of this patent is extended or adjusted under 35 U.S.C. 154(b) by 0 days.

(21) Appl. No.: 09/601,290
(22) PCT Filed: Jan. 27, 1999
(86) PCT No.: PCT/US99/01743
§ 371 (c)(1),
(2), (4) Date: Jul. 27, 2000
(87) PCT Pub. No.: WO99/39015
PCT Pub. Date: Aug. 5, 1999

Related U.S. Application Data

(60) Provisional application No. 60/072,800, filed on Jan. 28, 1998.

(51) Int. Cl.$^7$ ................................................ C22C 19/05
(52) U.S. Cl. ........................ 148/427; 420/452; 420/453
(58) Field of Search .......................... 148/427; 420/452, 420/453

(56) References Cited

U.S. PATENT DOCUMENTS

| | | |
|---|---|---|
| 2,868,639 A | 1/1959 | Gonser, Jr. |
| 3,318,694 A | 5/1967 | Heitmann |
| 4,093,453 A | 6/1978 | Makino et al. |
| 4,093,454 A | 6/1978 | Saito et al. |
| 4,400,211 A | 8/1983 | Kudo et al. |
| 4,400,349 A | 8/1983 | Kudo et al. |
| 4,421,571 A | 12/1983 | Kudo et al. |
| 4,556,607 A | 12/1985 | Sastri |
| 5,314,659 A | 5/1994 | Hidaka et al. |
| 5,424,029 A | 6/1995 | Kennedy et al. |
| 5,674,449 A | 10/1997 | Liang et al. |
| 5,808,214 A | 9/1998 | Kaneko et al. |

FOREIGN PATENT DOCUMENTS

| | | |
|---|---|---|
| EP | 796927 A | 9/1997 |
| JP | 55100949 A | 8/1980 |
| JP | 55104451 A | 8/1980 |
| JP | 55148741 A | 11/1980 |
| JP | 56055545 A | 5/1981 |
| JP | 57029550 A | 2/1982 |
| JP | 57101635 A | 6/1982 |
| JP | 59074266 A | 4/1984 |
| JP | 62033089 A | 2/1987 |
| JP | 08291376 A | 11/1996 |

OTHER PUBLICATIONS

ASM Handbook, 1992, vol. 3, pp. 2–197 and 3–48 Alloy Phase Diagrams.

*Primary Examiner*—Sikyin Ip
(74) *Attorney, Agent, or Firm*—Burns, Doane, Swecker & Mathis, LLP

(57) ABSTRACT

A nickel based alloy is provided which includes, in weight percentage, carbon from about 2 to about 3;
chromium from about 30 to about 40;
tungsten from about 12 to about 18;
iron from about 3.5 to about 8.5;
molybdenum from about 1 to about 8;
manganese up to about 0.5;
silicon up to about 1.0; and
the balance nickel and incidental impurities. The alloy is useful for internal combustion engine valve seat inserts and the like.

28 Claims, No Drawings

NICKEL BASED ALLOYS FOR INTERNAL COMBUSTION ENGINE VALVE SEAT INSERTS, AND THE LIKE

CROSS-REFERENCE TO RELATED APPLICATIONS

This patent application is a U.S. national application claiming priority under 35 U.S.C. §371 to international patent application No. PCT/US99/01743 filed on Jan. 27, 1999, which claims priority, under 35 U.S.C. §119, to provisional patent application No. 60/072,800 filed on Jan. 28, 1998.

BACKGROUND OF THE INVENTION

1. Technical Field

The present invention relates to nickel based alloys having high hardness and compressive yield strength. Such alloys are especially useful for engine parts such as valve seat inserts. Another aspect of the invention relates to part s made of such alloys.

2. Related Prior Art

Nickel based valve seat insert alloys generally have wear resistance, heat resistance, and corrosion resistance superior to those f high alloy steels, and are therefore often used as materials for structural members serving under severe conditions, such as valve seat inserts. Known nickel based alloys used for exhaust valve seat inserts, such as an alloy identified as J96 and marketed by L. E. ones Company, have relatively good characteristics, including good hardness and compressive yield strengths.

SUMMARY OF TH INVENTION

Valve seat inserts made of such known alloys may experience wear in some heavy duty engine applications. Such wear may be caused, in part, by a lack of fineness and uniformity in the microstructure of the alloy. Microstructure refers to carbide size and distribution within a matrix material; a finer microstructure has a greater number of smaller car ides distributed throughout the matrix material. Such wear may also be caused, in part, by a weak matrix material which does not adequately support the carbides. Therefore, a nickel based alloy having more fineness and uniformity in the microstructure and a high matrix strength resulting in higher hardness and compressive yield strength is desirable.

The present invention is a nickel based alloy which has good fineness and uniformity in the microstructure in combination 4 with a high matrix strength resulting in increased hardness and compressive yield strength properties. These properties provide an alloy having increased wear resistance at elevated temperatures. Also, when the alloy is used as a material or a valve seat insert, the increased compressive yield strength of the alloy provides an insert having improved retention, i.e., the valve seat remains properly seated in the cylinder head counterbore.

Cobalt-base materials, such as alloy identified as J3 and marketed by L. E. Jones Company, which tend to demonstrate good wear properties, have also been used to manufacture valve seat inserts. Utilizing the alloy of the present invention, goo wear properties may be obtained without the addition of relatively expensive cobalt material.

In one aspect, the preset invention is an alloy which comprises:

| Element | Weight Percent Range |
|---|---|
| C | from about 2 to about 3 |
| Cr | from about 30 to about 40 |
| W | from about 12 to about 18 |
| Fe | from about 3.5 to about 8.5 |
| Mo | from about 1 to about 8 |
| Mn | 0 to about 0.5 |
| Si | 0 to about 1.0 |
| Ni and incidental impurities | Balance |

In another aspect, the present invention is a nickel based alloy which contains, in weight percent;

chromium from about 34.0 to about 37.0;

iron from about 5.0 to about 7.0;

molybdenum from about 2 to about 6.25; and the balance nickel, other alloying elements, and incidental impurities;

wherein the chromium, iron, and molybdenum content of the alloy increase the fineness and uniformity of the microstructure and increase the matrix strength of the alloy thereby resulting in the alloy having increased hardness and compressive yield strength.

In another aspect, the present invention is a cast alloy comprising chromium, nickel, tungsten, iron and molybdenum, wherein the relative concentration of Cr, Ni and W is such that a three-phase eutectic composition is capable of forming at a temperature of about 800° C.

The present invention is a substantial modification over existing industry standard nickel based alloys. One of the modifications over existing industry standard nickel based alloys may be accomplished by increasing the chromium and adding molybdenum to the alloy. The microstructure of the resulting alloy is much finer and more uniform than that of existing standard alloys. The molybdenum serves to increase the matrix and grain boundary strength.

In another aspect of the invention, metal parts such as valve seat inserts are made from the alloy.

In addition to higher hardness and higher compressive yield strength, the preferred alloys of the present invention also tend to have good wear resistance, good corrosion resistance and good oxidation resistance.

Before embodiments of the invention are explained in detail, it is to be understood that the invention is not limited in its application to the details of the composition and concentrations of components set forth in the following description. The invention is capable of other embodiments and of being practiced or being carried out in various ways. Also, it is understood that the phraseology and terminology used herein is for the purpose of description and should not be regarded as limiting.

DETAILED DESCRIPTION OF PREFERRED EMBODIMENTS

The present invention is directed to a nickel based alloy with improved hardness, compressive yield strength, and wear resistance. The alloy is designed particularly for use in internal combustion engine valve seat inserts, but many other applications are feasible. The present invention is based on experimental findings that hardness and compressive yield strength of the nickel based alloys can be significantly increased by increasing the matrix strength and improving the fineness and uniformity of the resulting microstructure; this may be achieved by increasing the chromium content to higher levels, and by adding molybdenum to the nickel based alloy.

Carbon (C) is present in the alloy in an amount ranging from about 2 to about 3 weight percent of the total alloy; preferably, at least about 2.2 weight percent; preferably, at most about 2.6 weight percent.

Chromium (Cr) is present in the alloy in an amount ranging from about 30 to about 40 weight percent of the total alloy. The chromium content should be high enough to achieve a three-phase eutectic microstructure with nickel and tungsten at a temperature of about 800° C. Preferably, the chromium content is at least about 34.0 weight percent. Preferably, the chromium content is at most about 37.0 weight percent.

Tungsten (W) is present in the alloy in an amount ranging from about 12 to about 18 weight percent of the total alloy. Preferably, the tungsten content is at least about 14.0 weight percent. Preferably, the tungsten content is at most about 16.0 weight percent.

Iron (Fe) is present in the alloy in an amount ranging from about 3.5 to about 8.5 weight percent of the total alloy; preferably, at least about 5.0 weight percent. Preferably, the iron content is at most about 7.0 weight percent. Preferably, the Mo and Fe content is controlled so the combination of iron and molybdenum tends to form an intermetallic Laves phase $Fe_2Mo$ which strengthens the grain boundaries. The temperature and relative concentration of Mo and Fe to form a Laves phase may be determined by reference to a Fe—Mo binary phase diagram. Such a diagram is shown, for example, on page 2–197 of the ASM Handbook, Copyright 1992, Volume 3, which is herein fully incorporated by reference.

Molybdenum (Mo) is present in the alloy in an amount ranging from about 1 to about 8 weight percent of the total alloy. Generally, greater molybdenum increases alloy hardness and decreases carbide size; however, too much molybdenum may result in a brittle product. The weight percent molybdenum is preferably at least about 2 weight percent. The weight percent molybdenum is preferably at most;about 6.25 weight percent. Most preferably, the alloy contains about 4 to 5 weight percent Mo.

Manganese (Mn) can be added or present in an amount of up to about 0.5 weight percent of the total alloy.

Silicon (Si) may be added to or present in the alloy at levels up to about 1.0 weight percent of the total alloy.

The balance of the alloy is nickel (Ni) and incidental impurities. Generally, the alloy contains at least about 20 weight percent nickel; preferably at least about 30 weight percent.

At 800° C., the matrix material between the carbides preferably contains a three-phase eutectic composition of the elements Cr—Ni—W, which provides increased strength. The relative concentration of Cr—Ni—W necessary to form a three-phase eutectic composition may be determined by reference to a Cr—Ni—W ternary component phase diagram. Such phase diagrams are shown, for example, on page 3–48 of the ASM Handbook, Copyright 1992, Volume 3, which is herein incorporated by reference.

In a highly preferred embodiment, the alloy comprises:

| Element | Weight Percent Range |
|---|---|
| C | from about 2.2 to about 2.6 |
| Cr | from about 34.0 to about 37.0 |
| W | from about 14.0 to about 16.0 |
| Fe | from about 5.0 to about 7.0 |
| Mo | from about 2 to about 6.25 |
| Mn | up to about 0.5 Max |
| Si | up to about 1.0 Max |
| Ni and incidental impurities | Balance |

Metal parts are either made from the alloy, such as by casting or forming from a powder and sintering, or the alloy is used to hardface the parts. Preferably, the alloy is manufactured by casting. Casting is a conventional process in which raw materials are added together and melted to liquid state, and then poured into a cast mold.

Preferably, the metal parts are valve seat inserts for use in internal combustion engines.

Data obtained on an alloy embodying the alloy of the invention is shown in the tables listed in Example 1.

Although the alloy is nickel-based, the thermal expansion coefficient of the alloy tends to be closer to that of iron than nickel. (The thermal expansion coefficient of cast iron is approximately $11.5 \times 10^{-6}$ mm/mm ° C. at a temperature of 25–600° C.) This is beneficial because the insert tends to be much hotter than the surrounding material when the engine is operating. If the thermal expansion coefficient of the insert alloy closely matches that of the cylinder head alloy, this enables the insert and cylinder head to expand at the same rate, thereby improving insert retention characteristics.

The alloy has good high temperature compressive yield strength which increases wear resistance and decreases material yielding during operation. Decreased yielding serves to improve insert retention. Preferably, the alloy has a compressive yield strength of at least about 110 thousand pounds per square inch (KSI) at room temperature; more preferably, about 130 KSI at room temperature.

Increased hot hardness contributes to improved wear resistance and provides a safety factor for inserts which run beyond the normal operating temperature.

EXAMPLE 1

An alloy embodying the present invention is made, and tested for hardness, thermal expansion coefficient and compressive yield strength. The alloy is manufactured using a conventional induction melting furnace. The following materials are employed to make a 60 pound (lb.) heat of the alloy of the invention:

| Weight (lbs.) | Material |
|---|---|
| 25 | scrap alloy of the invention |
| 12.6 | Nickel |
| 8.2 | Aluminothermic Chrome |
| 6 | Low Carbon Ferro Chrome |

-continued

| Weight (lbs.) | Material |
|---|---|
| 5.8 | Densalloy |
| 1.4 | Pure molybdenum |
| 0.9 | Carbon |
| 0.33 | Ferro silicon |
| 0.2 | Ferro Manganese |

Densalloy is a powdered metal alloy with approximately 90% tungsten content commercially available, for example, from Voss Metals of Rockford, Ill. The raw materials are added to the furnace first, followed by the scrap material. The materials are heated until they are melted. once the material is fully molten, a spectrochemical sample of the material is taken for chemical analysis. A spectrochemical analysis verifies the following material chemistry:

The temperature of the metal is then increased to pouring temperature and stabilized. The molten metal is de-slagged, and inoculation materials are added. The furnace power is then increased to full power for approximately 15 seconds to fully mix the inoculation materials into the molten metal. The metal is then poured into a mold.

The Rockwell C (HRC) hardness of the resulting alloy at room temperature is HRC 54.

In this example, material properties of hot hardness, compressive yield strength, and thermal expansion coefficient were measured. The test results are as follows:

The compressive yield strength of the nickel alloy at different temperatures is as follows:

The hot hardness of the nickel alloy at different temperatures is as follows:

The thermal expansion coefficient of the nickel alloy at different temperature ranges is as follows:

EXAMPLE 2

An alloy is made as in Example 1 except a 725 pound heat of the alloy was produced. The following materials were employed:

A spectrochemical analysis verifies the following material chemistry:

Valve seat inserts of the alloy of this Example 2 were tested in a six cylinder turbocharged diesel engine. The engine was equipped with a split set-up of Example 2 alloy inserts in cylinders 1,3, and 5 and J3 (Stellite 3) alloy inserts in cylinders 2,4, and 6. J3 is a premium cobalt based valve insert material which is known for its exceptional wear resistance. Each cylinder contains two inserts of the materials being tested (6 inserts total of each material). The engine was run for over 500 hours under rigorous test conditions. After test, total wear of valve and insert were measured.

Based upon these results, it was concluded that the performance of the insert alloy of the invention was equal to that of the J3 insert alloy. This result validated the objective to develop a nickel based alloy having similar wear performance as more costly cobalt base insert alloys.

It should be appreciated that the alloys of the present invention are capable of being incorporated in the form of a variety of embodiments, only a few of which have been described above. The invention may be embodied in other forms without departing from its spirit or essential characteristics. The described embodiments are considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A nickel based alloy comprising, in weight percentage:
   carbon from about 2 to about 3;
   chromium from about 30 to about 40;
   tungsten from about 12 to about 18;
   iron from about 3.5 to about 8.5;
   molybdenum from about 4 to about 5;
   manganese up to about 0.50;
   silicon up to about 1.0; and
   the balance nickel and incidental impurities.

2. The alloy of claim 1, wherein the alloy comprises at least about 2.2 weight percent carbon.

3. The alloy of claim 1, wherein the alloy comprises at least about 34.0 weight percent chromium.

4. The alloy of claim 1, wherein the alloy comprises at least about 14.0 weight percent tungsten.

5. The alloy of claim 1, wherein the alloy comprises at least about 5.0 weight percent iron.

6. The alloy of claim 1, wherein the alloy comprises about 4.5 weight percent molybdenum.

7. The alloy of claim 1, wherein the alloy comprises at most about 2.6 weight percent carbon.

8. The alloy of claim 1, wherein the alloy comprises at most about 37.0 weight percent chromium.

9. The alloy of claim 1, wherein the alloy comprises at most about 16.0 weight percent tungsten.

10. The alloy of claim 1, wherein the alloy comprises at most about 7.0 weight percent iron.

11. The alloy of claim 1, wherein the relative concentration of Cr, Ni and W is such that a three-phase eutectic composition forms at a temperature of about 800° C.

12. The alloy of claim 1, wherein the alloy comprises, in weight percentage:
   carbon from about 2.2 to about 2.6;
   chromium from about 34.0 to about 37.0;
   tungsten from about 14.0 to about 16.0;
   iron from about 5.0 to about 7.0;
   molybdenum from about 4 to about 5;
   manganese up to about 0.5;
   silicon up to about 1.0; and
   the balance nickel and incidental impurities.

13. The alloy of claim 1, wherein said alloy is manufactured by casting.

14. The alloy of claim 12, wherein said alloy is manufactured by casting.

15. The alloy of claim 1, wherein said alloy is used to make a valve seat insert for an internal combustion engine.

16. The alloy of claim 1, wherein the ratio of Mo and Fe is such that an intermetallic Laves phase $Fe_2Mo$ forms.

17. A valve seat insert for use in an internal combustion engine, said valve seat insert made of an alloy consisting essentially of in wieght percent:
   carbon from about 2 to about 3;
   chromium from about 30 to about 40;
   tungsten from about 12 to about 18;
   iron from about 3.5 to about 8.5;
   molybdenum from about 4 to about 5;
   manganese up to about 0.5;

silicon up to about 1.0; and the balance nickel and incidental impurities.

18. The valve seat insert of claim 17, wherein said alloy is manufactured by casting.

19. The valve seat insert of claim 17, wherein the alloy comprises:
carbon from about 2.2 to about 2.6;
chromium from about 34.0 to about 37.0;
tungsten from about 14.0 to about 16.0;
iron from about 5.0 to about 7.0;
molybdenum from about 4 to about 5;
manganese up to about 0.5;
silicon up to about 1.0; and
the balance nickel and incidental impurities.

20. The valve seat insert of claim 17, wherein the alloy consists of, in weight percent:
carbon from about 2 to about 3;
chromium from about 30 to about 40;
tungsten from about 12 to about 18;
iron from about 3.5 to about 8.5;
molybdenum from about 4 to about 5;
manganese up to about 0.5;
silicon up to about 1.0; and
the balance nickel and incidental impurities.

21. A nickel based alloy consisting essentially of in weight percent:
chromium from about 34.0 to about 37.0;
iron from about 5.0 to about 7.0;
molybdenum from about 4 to about 5; and
the balance nickel, other metals, and incidental impurities;
wherein the chromium, iron, and molybdenum content of the alloy increase the fineness and uniformity of the microstructure of the alloy thereby resulting in the alloy having increased hardness and compressive yield strength.

22. The nickel based alloy of claim 21, wherein said alloy is used to make a valve seat insert for an internal combustion engine.

23. The nickel based alloy of claim 21, wherein said alloy has a compressive yield strength of at least about 110 KSI at room temperature.

24. The nickel based alloy of claim 21, wherein the alloy consists of, in weight percent;
chromium from about 34.0 to about 37.0;
iron from about 5.0 to about 7.0;
molybdenum from about 4 to about 5; and
the balance nickel, other metals, and incidental impurities.

25. A cast alloy comprising chromium, nickel, tungsten, iron and molybdenum, wherein the relative concentration of Cr, Ni and W is such that a three-phase eutectic composition is capable of forming at a temperature of about 800° C., the alloy consisting essentially of in weight percent:
molybdenum from about 4 to about 5,
chromium from about 30 to about 40, and
tungsten from about 12 to about 18,
and the alloy further comprises carbon from about 2 to about 3 weight percent.

26. The cast alloy of claim 25 wherein the alloy is used to make a valve seat insert for an internal combustion engine.

27. The cast alloy of claim 25 wherein the ratio of Fe to Mo is such that an intermetallic Laves phase $Fe_2Mo$ forms.

28. The nickel based alloy of claim 1, wherein the alloy consists of, in weight percentage:
carbon from about 2 to about 3;
chromium from about 30 to about 40;
tungsten from about 12 to about 18;
iron from about 3.5 to about 8.5;
molybdenum from about 4 to about 5;
manganese up to about 0.50;
silicon up to about 1.0; and
the balance nickel and incidental impurities.

\* \* \* \* \*